Dec. 25, 1923.
D. DUNCAN
1,478,428
ANTITILTING DEVICE FOR TRACTORS
Filed July 10, 1922
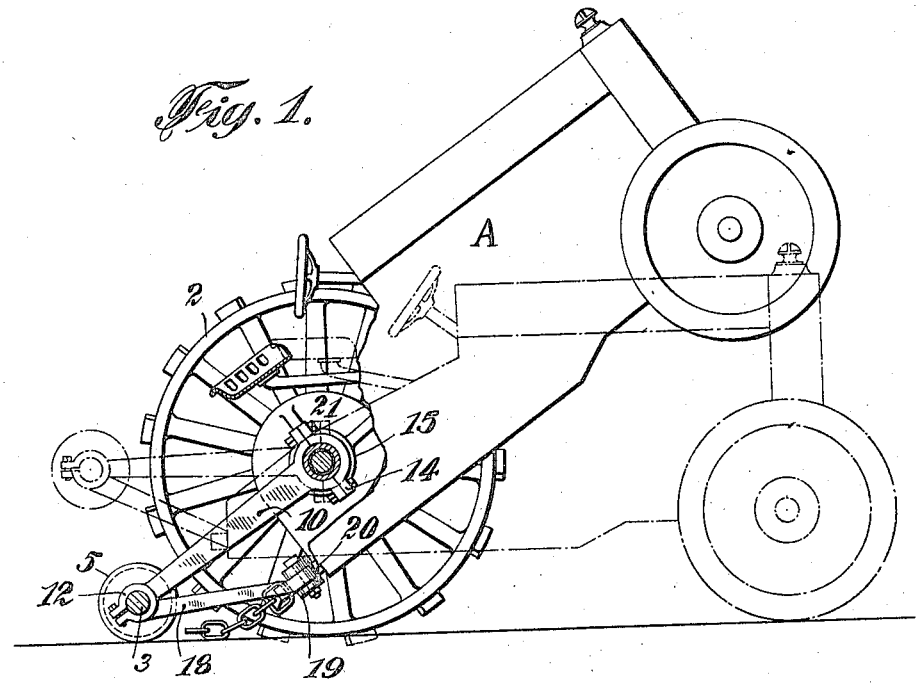
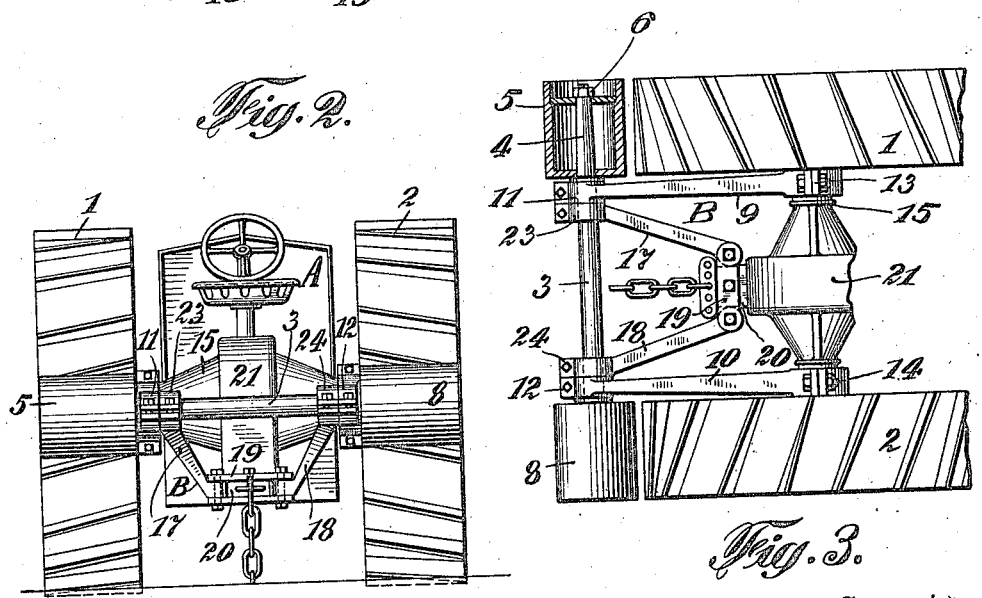
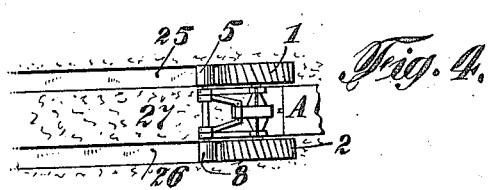
Inventor
David Duncan Patented Dec. 25, 1923.

1,478,428

UNITED STATES PATENT OFFICE.

DAVID DUNCAN, OF BROOKLYN, NEW YORK.

ANTITILTING DEVICE FOR TRACTORS.

Application filed July 10, 1922. Serial No. 574,054.

*To all whom it may concern:*

Be it known that I, DAVID DUNCAN, a citizen of the United States, and a resident of the borough of Brooklyn, county of Kings, and State of New York, have invented certain new and useful Improvements in Antitilting Devices for Tractors, set forth in the following specification.

This invention relates to anti-rearing means to prevent tractors of the type having rear traction-wheels, such as the Fordson tractor, from tilting over backward.

Heretofore, some attempts have been made to check this rearing by the provision of rearward extensions to engage the ground between and back of the traction-wheels at the time of rearing. Such devices, however, engage the irregular soft surface such as that of a plowed field and not only ineffectively check the rearing but, if they should check the rearing, stop the forward progress of the tractor.

The object of the present invention is to check the rearward tilting of a tractor of this type and, at the same time, permit its forward progress under duty. To this end, I contemplate the provision of safety-stops preferably in the form of idlers or rollers mounted at the rear of the traction-wheels above their trackway and localized and arranged so as to tread solely upon the trackway of the traction-wheels. By this provision, the fulcrum about which the backward tilting takes place is only momentarily shifted to the axle of the idlers and, on account of their rolling contact with the trackway of the traction-wheels, no appreciable added load is added to the tractor which continues to operate forward under duty and immediately rights itself after overcoming the added resistance which occasioned the rearing.

A further object of the invention is to provide improved means for attaching an anti-rearing device to a tractor of this type. To this end, I contemplate a truss framework ready for attachment to a commercial tractor, particularly of the Fordson type. The above and further objects of my invention will better be understood by reference to its illustrative embodiment to which the claims are directed merely for the purpose of illustration and which is described in the following specification in connection with the accompanying drawings which form a part hereof.

In the drawings, Fig. 1 is a side elevation of a rearing tractor fitted with my invention and partly in diagram:

Fig. 2 is a rear elevation of the tractor in normal position;

Fig. 3 is a top plan view, partly in horizontal section, of a tractor fitted with my invention; and Fig. 4 is a diagram indicating the tracking of the idlers in the trackways of the traction-wheels.

In Fig. 1, the tractor of the type having rear traction-wheels 1 and 2 is shown rearing or backwardly tilting in full lines, the dot and dash lines showing normal position. To check the rearward tilting and prevent overturning, I provide an auxiliary cross-member 3, preferably in the form of an axle, providing a bearing 4 at each end rotatedly mounting a safety-stop in the form of an idler 5 which may be held to its journal by the use of a hub nut 6. The axle 3 parallels and is located about in the horizontal plane of and to the rear of the axis of the traction-wheels 1 and 2. The idlers 5 and 8 are so localized and located as to have approximately the same width of tread as that of the corresponding traction-wheels 1 and 2, although it is to be understood that this tread may be of somewhat less width than the tread of traction-wheels 1 and 2, if so desired.

A truss frame-work B arranged for ready attachment to the tractor A rigidly supports the axle 3 in position. In the embodiment illustrated, the frame-work B comprises a pair of compression arms 9 and 10, having clamps 11 and 12 at the rear securing the axle 3, and at their forward ends they are provided with strap clamps 13 and 14 taking over the axle housing 15 near its ends. Tension arms 17 and 18 are readily secured at their forward ends by the clamp 19 to the traction block 20 forming a part of the differential housing 21 centrally and in the lower portion thereof. The rear ends of these tension arms 17 and 18 may likewise be secured in any suitable manner to the rear ends of the arms 9 and 10, the attachment being effected in the present embodiment by means of clamps 23 and 24 clamping directly upon the axle 3.

It is important to note that it is only upon the hard-packed trackways 25 and 26 that anti-rearing engagement without retardation of forward progress such as rolling engagement by the safety-stops 5 and 8 is feasible and it should be noted that these safety-stops 5 and 8 are arranged to track solely in these trackways and do not depend upon engagement with the soft, irregular, intermediate surface 27.

The inventive thought may have a variety of expressions as is contemplated in what I claim and desire to secure by Letters Patent of the United States as follows:

1. An attachment to check rearward tilting of tractors having rear traction wheels, comprising a rearwardly extending framework for attachment to the frame of the tractor; and a pair of safety-stop idlers mounted by said frame-work to rotate on an axis parallel to and to the rear of the axis of said traction-wheels and arranged to track, upon the rearing of the tractor in the same tracks as do said traction-wheels, whereby the rearward tilting is checked by the said idlers making rolling contact with a firm trackway and without checking the forward progress of the tractor.

2. An attachment to check the rearward tilting of tractors having rear traction-wheels, comprising a frame-work for attachment to the frame of the tractor; and a pair of safety-stops carried by said framework, positioned at the rear of said traction-wheels and localized so as to engage only the trackways of said traction-wheels upon the rearing of the tractor.

3. An anti-rearing attachment for tractors having rear traction-wheels, comprising an auxiliary axle paralleling the axle of said traction-wheels and at the rear thereof; a pair of safety-stops idlers, each having a tread not exceeding that of the tread of the corresponding traction-wheel and journalled to the ends of said auxiliary axle to track upon the corresponding trackways of said traction-wheels solely when said tractor rears; a truss-frame for attaching said auxiliary axle to the frame of said tractor, said truss-frame comprising a pair of laterally spaced compression-arms to be attached to the axle housing of said tractor near its ends, and a pair of rearwardly and upwardly diverging tension-arms fixed at their rear ends relatively to said auxiliary axle and to be attached at their front ends to a lower central part of the frame of said tractor.

In witness whereof I have signed my name to this specification, this 6th day of July, 1922.

DAVID DUNCAN.